Patented Mar. 10, 1931

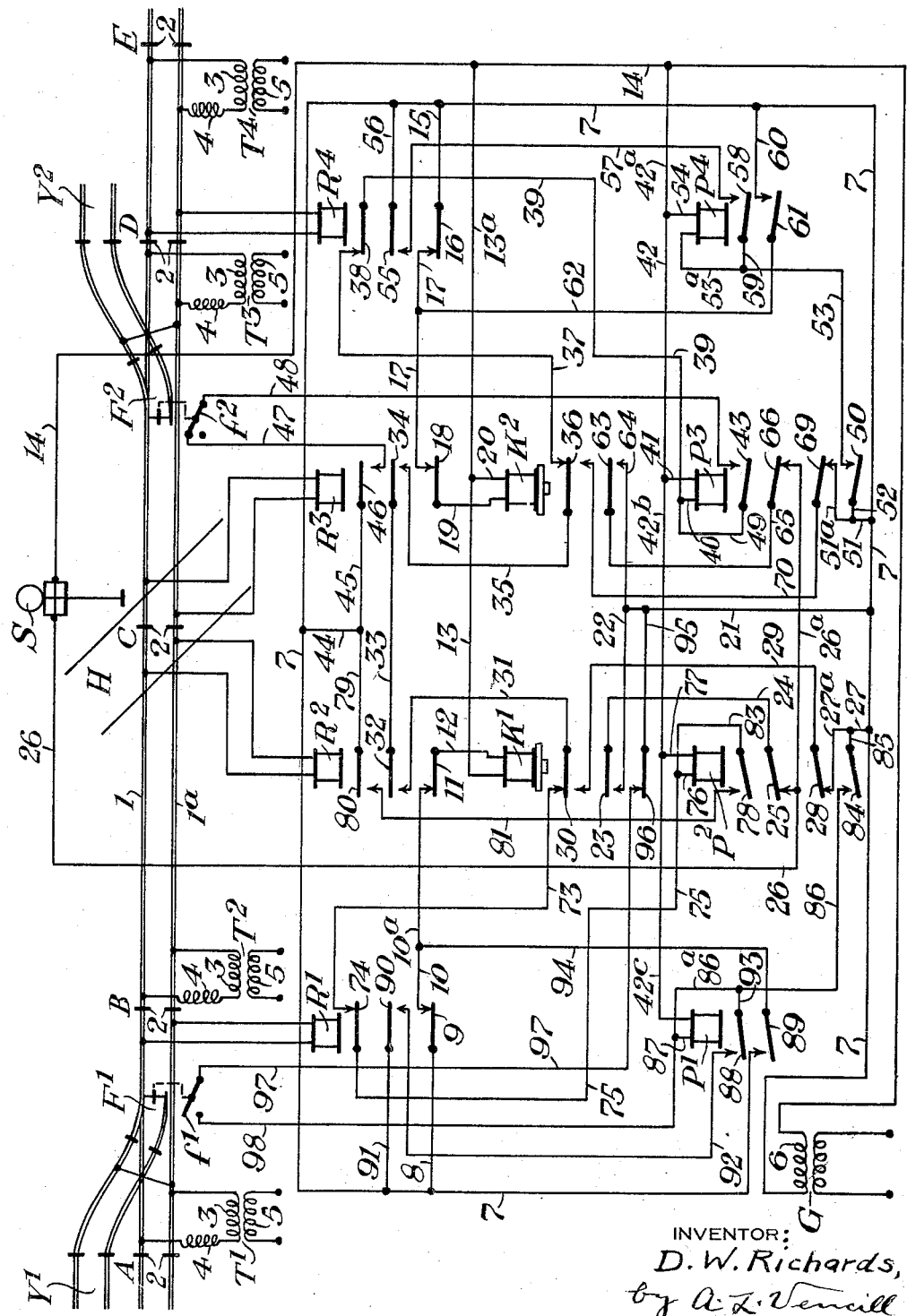

1,795,444

UNITED STATES PATENT OFFICE

DANIEL W. RICHARDS, OF ROANOKE, VIRGINIA, ASSIGNOR TO THE UNION SWITCH & SIGNAL COMPANY, OF SWISSVALE, PENNSYLVANIA, A CORPORATION OF PENNSYLVANIA

SIGNALING APPARATUS

Application filed December 4, 1929. Serial No. 411,480.

My invention relates to signaling apparatus, and particularly to apparatus of the type comprising a highway crossing signal located adjacent the intersection of a railway and a highway and controlled by traffic conditions in the adjacent stretch of track.

I will describe one form of signaling apparatus embodying my invention, and will then point out the novel features thereof in claims.

The single figure of the accompanying drawing is a diagrammatic view illustrating one form of signaling apparatus embodying my invention.

Referring to the drawing, the reference characters 1 and $1^a$ designate the rails of a railway track which is intersected by a highway H protected by a signal S and which track is divided into a plurality of sections A—B, B—C, C—D and D—E, by means of insulated joints 2. A track switch $F^1$ connects the section A—B with a spur track or siding $Y^1$, and a second track switch $F^2$ connects the section C—D with a spur track or siding $Y^2$. Circuit controllers $f^1$ and $f^2$ are operatively connected with the switches $F^1$ and $F^2$, respectively, and control certain apparatus hereinafter to be described.

The sections A—B, B—C, C—D and D—E are provided with track circuits which are supplied with current from the secondary windings 3 of track transformers $T^1$, $T^2$, $T^3$ and $T^4$, and which secondary windings are each electrically connected across the rails 1 and $1^a$ adjacent one end of the associated section through an impedance 4. The primaries 5 of the track transformers are connected with a common source of electric energy, such as line wires, not shown. The track circuits of the several sections also include the windings of track relays $R^1$, $R^2$, $R^3$ and $R^4$ which are connected across the rails 1 and $1^a$ adjacent the other ends of the sections. A slow-releasing relay $K^1$ is associated with and controlled in part by the track relays $R^1$ and $R^2$, and a similar relay $K^2$ is associated with and controlled in part by the track relays $R^3$ and $R^4$. The system also includes a plurality of stick relays $P^1$, $P^2$, $P^3$ and $P^4$, which are controlled as will hereinafter be described.

Under normal operating conditions, that is to say, when the sections A—B, B—C, C—D and D—E are unoccupied, the track relays $R^1$, $R^2$, $R^3$ and $R^4$ are all energized by their respective track circuits, thereby maintaining the slow-releasing relays $K^1$ and $K^2$ energized by current from a suitable source, such as the secondary 6 of a line transformer G. The circuit for relay $K^1$ is from transformer G, through wires 7 and 8, front contact 9 of track relay $R^1$, wires 10 and $10^a$, front contact 11 of track relay $R^2$, wire 12, winding of slow-releasing relay $K^1$, and wires 13, $13^a$ and 14 back to transformer G. The circuit for relay $K^2$ is from transformer G, through wires 7 and 15, front contact 16 of track relay $R^4$, wires 17 and $17^a$, front contact 18 of track relay $R^3$, wire 19, winding of slow-releasing relay $K^2$, and wires 20, $13^a$ and 14 back to transformer G. Under these conditions, stick relays $P^1$, $P^2$, $P^3$ and $P^4$ are all de-energized, and the circuits through the crossing signal S are open.

If, however, a train travelling from west to east, that is to say, from left to right, with respect to the drawing, enters the section A—B, the track circuit in this section is shunted thereby, thus de-energizing the track relay $R^1$ in a well known manner. This opens the circuit previously traced for slow-releasing relay $K^1$ and this relay becomes de-energized. The de-energization of the relay $K^1$ establishes a circuit from transformer G through wires 7, 21, and 22, back contact 23 of slow-releasing relay $K^1$, wire 24, back contact 25 of stick relay $P^2$, wire 26, actuating mechanism of signal S, and wire 14 back to transformer G. The current in this circuit operates the signal S, which may be a bell, light, or other suitable crossing signal, and will warn those in the proximity of the crossing H of the approach of a train.

The operation of the signal S commences as soon as the train enters the section A—B and continues as it enters and proceeds through the section B—C in the following manner. As soon as the train enters section B—C, the track relay $R^2$ is immediately de-energized and opens its front contact 11. It will be noted at this point that the circuit for relay $K^1$ includes both the front contacts 9 and 11 of the track relays $R^1$ and $R^2$ and therefore the opening of this circuit through the contact 11 maintains the relay $K^1$ de-energized notwithstanding the closing of front contact 9 of relay $R^1$ upon the exit of the train from the section A—B. The signal circuit previously traced through the contacts 23 and 25 therefore remains closed as the train passes through section B—C.

As the train enters the section C—D, the track relay $R^3$ is de-energized, thereby opening the circuit through its front contact 18 and de-energizing the slow-releasing relay $K^2$. Furthermore, the presence of the rear portion of the train in the preceding section B—C, maintains the track relay $R^2$ de-energized and holds slow-releasing relay $K^1$ open. As a result of the above described conditioning of the several relays, as the train crosses the highway H, the signal S is maintained in operation by current flowing in the circuit previously traced through back contacts 23 and 25 of relays $K^1$ and $P^2$, respectively.

By virtue of the delayed action of the slow-releasing relay $K^2$ this relay, although de-energized as above described, maintains its front contact 36 closed for sufficient time to permit a pick-up circuit to be established therethrough for the stick relay $P^3$. This pick-up circuit may be traced from transformer G, through wires 7, 27 and $27^a$, back contact 28 of stick relay $P^2$, wire 29, back contact 30 of slow-releasing relay $K^1$, wire 31, back contact 32 of track relay $R^2$, wire 33, back contact 34 of track relay $R^3$, wire 35, front contact 36 of slow-releasing relay $K^2$, wire 37, front contact 38 of track relay $R^4$, wires 39 and 40, winding of stick relay $P^3$, and wires 41, 42, $42^a$ and 14 back to transformer G. The current in the pick-up circuit just traced energizes the stick relay $P^3$ and causes it to close its front contact 43, which operation completes a stick circuit from transformer G through wires 7, 44 and 45, back contact 46 of track relay $R^3$, wire 47, circuit controller $f^2$, which is normally closed, wire 48, front contact 43 of stick relay $P^3$, wires 49 and 40, winding of stick relay $P^3$ and wires 41, 42 and 14 back to transformer G. Relay $P^3$ is therefore held energized, over the stick circuit just traced, after relay $K^3$ opens at the conclusion of its holding interval. The energization of the stick relay $P^3$ also closes its front contact 50 and energizes relay $P^4$ over a pick-up circuit which may be traced from transformer G, through wires 7, 51 and 52, front contact 50 of stick relay $P^3$, wires 53 and $53^a$, winding of stick relay $P^4$, and wires 54, $42^a$ and 14 back to transformer G.

As soon as the rear end of the train leaves section B—C, the track relay $R^2$ again becomes energized, and closes its front contact 11, thereby re-establishing the circuit through the winding of the slow-releasing relay $K^1$ and energizing this relay. The energization of the relay $K^1$ opens its back contact 23, thereby discontinuing the operation of the signal S.

As the train enters section D—E it causes the de-energization of the track relay $R^4$, which closes a back contact 55. This establishes a stick circuit for the relay $P^4$ from the transformer G through wires 7 and 56, back contact 55, wire 57, front contact 58 of stick relay $P^4$, wires 59 and $53^a$, winding of stick relay $P^4$, and wires 54, $42^a$ and 14, back to transformer G.

As the rear end of the train passes out of the section C—D, the track relay $R^3$ again becomes energized and opens its back contact 46, thereby breaking the stick circuit for relay $P^3$. Relay $P^4$ remains energized over its stick circuit including its own front contact 58 and back contact 55 of relay $R^4$. The energization of the track relay $R^3$ also closes its front contact 18 and establishes a circuit for the slow-releasing relay $K^2$ from transformer G, through wires 7 and 60, front contact 61 of stick relay $P^4$, wires 62 and 17, front contact 18 of track relay $R^3$, wire 19, winding of slow-releasing relay $K^2$, wires 20, $13^a$ and 14 back to transformer G. Relay $K^2$ then picks up to close its front contacts and to open its back contacts.

As soon as the train passes out of section D—E the track relay $R^4$ again becomes energized and not only opens its back contact 55, thereby opening the stick circuit for the relay $P^4$, but closes its front contact 16, thereby re-establishing the normal circuit through the slow-releasing relay $K^2$.

The operation of the signaling system for westbound traffic is substantially the reverse of that hereinbefore described in connection with eastbound traffic. For example, if a westbound train enters the section D—E from the right, as shown in the drawing, the track relay $R^4$ is de-energized, thereby opening its back contact 16. This causes the de-energization of the slow-releasing relay $K^2$ and causes it to close its back contact 63. The closing of the back contact 63 of this relay establishes a circuit for signal S from the transformer G, through the wires 7, 21 and 64, front contact 63 of slow-releasing relay $K^2$, wire 65, back contact 66 of stick relay $P^3$, wires $26^a$ and 26, operating mechanism of signal S, and wire 14 back to transformer G.

When the train enters section C—D, the track relay $R^3$ becomes de-energized and opens its front contact 18 thus causing an additional break in the circuit through the slow-releasing relay $K^2$. In other respects the circuits remain unchanged while the train occupies this section and the signal S therefore continues to be operated through the circuit hereinbefore traced. As soon as the rear end of the train has passed entirely out of section D—E the track relay R⁴ again becomes energized, but relay K² remains de-energized and signal S continues to operate.

When the train enters section B—C at the highway crossing H the track relay R² becomes de-energized and closes its back contact 32 and opens its front contact 11. The opening of the contact 11 causes the de-energization of the slow-releasing relay K¹ but, by virtue of the slow-releasing characteristics of this relay, it maintains its contacts momentarily in the position they occupied while this relay was energized. This establishes a pick-up circuit for the stick relay P² from transformer G through wires 7, 51 and 51ª, contact 69 of stick relay P³, wire 70, back contact 36 of slow-releasing relay K², wire 35, back contact 34 of track relay R³, wire 33, back contact 32 of track relay R², wire 31, front contact 30 of slow-acting relay K¹, wire 73, front contact 74 of track relay R¹, wires 75 and 76, winding of stick relay P², and wires 77, 42ᵇ, 42, 42ª and 14 back to secondary 6.

The energization of the relay P² by the pick-up circuit just traced causes it to close its front contact 78, thereby establishing a stick circuit for this relay from secondary 6 through wires 7, 44 and 79, back contact 80 of track relay R², wire 81, front contact 78 of stick relay P², wires 83 and 76, winding of relay P², and wires 77, 42ᵇ, 42, 42ª back to transformer G.

At the expiration of a short interval of time the de-energized slow-releasing relay K¹ permits its front contact 30 to open, thereby opening the pick-up circuit through the stick relay P². This relay is, however, maintained energized by the stick circuit just traced through its front contact 78.

The energization of the stick relay P², as above described, also closes a front contact 84 thereof which establishes a pick-up circuit from the transformer G, through wires 7, 27 and 85, front contact 84 of stick relay P³, wires 86, 86ª and 87, winding of stick relay P¹, and wires 42ᶜ, 42ᵇ, 42, 42ª and 14 back to transformer G. The current in this circuit energizes the stick relay P¹.

During this time the signal S has been operated over the signal circuit previously traced, which has been maintained intact by the presence of the rear end of the train in the section C—D. As soon, however, as the train moves out of the section C—D, the track relay R³ again becomes energized, thereby closing its front contact 18 and causing the energization of the slow-releasing relay K². The energization of the relay K² opens the signal operating circuit through its back contact 63 and discontinues the operating of the highway crossing signal S.

When the train enters the section A—B, the stick relay R¹ becomes de-energized and closes a back contact 90 thereof. This establishes a stick circuit for the relay P¹ from transformer G through wires 7 and 91, back contact 90 of track relay R¹, wire 92, front contact 88 of stick relay P¹, wires 93, 86ª and 87, winding of stick relay P¹, and wires 42ᶜ, 42ᵇ, 42, 42ª and 14 back to transformer G.

As soon as the rear end of the train leaves the section B—C, the relay R² again becomes energized, thereby opening its back contact 80 and closing its front contact 11. This opens the stick circuit through the stick relay P² and also establishes a circuit for the slow-releasing relay K¹ from transformer G, through wire 7, front contact 89 of stick relay P¹, wires 94 and 10ª, front contact 11 of track relay R², wire 12, winding of slow-releasing relay K¹, and wires 13, 13ª and 14 back to transformer G. The relay K¹, being thus re-energized, opens its back contact 23, thereby preventing the signal S from being operated by a circuit that would otherwise be established through this contact by reason of the closing of the back contact 25 of the stick relay P².

When the train leaves the section A—B the track relay R¹ again becomes energized and opens its back contact 90, thereby opening the stick circuit for the relay P¹. The re-energization of the track relay R¹ also closes its front contact 9, thereby re-establishing the normal holding circuit through the slow-releasing relay K¹. The system is thus returned to its normal condition.

It will be apparent from the foregoing that the signal S is operated when relay K¹ is de-energized, provided relay P² is de-energized. But we have seen that relay P² is energized by a train moving westward, through sections A—B or B—C. It follows therefore that while relay K¹ is de-energized while a westbound train occupies section A—B or section B—C, yet under these conditions the energization of relay P² prevents operation of the signal S after the train has passed the crossing. In similar manner, the energization of relay P³ while an eastbound train occupies section C—D or D—E prevents operation of signal S after the train has passed the crossing even though relay K² is de-energized.

My system is also capable of correctly operating the highway signal S for other than through train movements. For example, if an eastbound train stops in section D—E after having left section C—D, the track relay R⁴ first becomes de-energized and establishes through its back contact 55, the stick circuit for the relay P⁴, as hereinbefore described. But relay P³ became de-energized when the train passed out of section C—D. If the train now backs into section C—D, the track relay R⁴ again becomes energized and opens the stick circuit for relay P⁴ at its back contact 55. Since the pick-up circuit for relay P⁴ is now open at front contact 50 of relay P³, relay P⁴ becomes de-energized. This opens the front contact 61 of the relay P⁴, and the circuit therethrough which maintains the slow-releasing relay K² energized. The deenergization of the relay K² closes its back contact 63 and establishes the circuit through the signal operating mechanism. The entry of the train into section C—D, also de-energizes the track relay R³, thereby opening its front contact 18. This maintains the slow-releasing relay K² de-energized and its back contact 63 closed. The circuit through the highway crossing signal S is thereby maintained until the train has backed out of section C—D. If the train continues to back, through sections B—C and A—B, the stystem will respond in a manner similar to that described in connection with a westbound train.

Conversely, if a westbound train stops in section A—B, and then backs into section B—C, the relay R² becomes de-energized and opens its front contact 11 and causes the de-energization of the slow-releasing relay K¹. The de-energization of this relay will in turn cause the back contact 23 thereof to close and establish an operating circuit for the highway signal S.

In addition to the foregoing, my system also includes circuits for controlling the operation of the highway crossing signal S in accordance with the movement of trains from the spur tracks Y¹ and Y² into the main track. For example, if the switch F¹ is reversed, in order to permit a train to move into the main track from the spur Y¹, the operation of the switch mechanism closes the circuit controller $f^1$ which is normally open. This closes a circuit from transformer G through wires 7, 21 and 95, front contact 96 of slow-releasing relay K¹, wire 97, circuit controller $f^1$, wires 98 and 87, winding of stick relay P¹, and wires 42ᶜ, 42ᵇ, 42, 42ᵃ and 14 back to transformer G. The current in the circuit just traced energizes the stick relay P¹, and causes it to close its front contact 89 and establish a circuit for slow-releasing relay K¹ from the transformer G, through wire 7, front contact 89 of stick relay P¹, wires 94 and 10ᵃ, front contact 11 of track relay R², wire 12, winding of slow-releasing relay K¹, and wires 13, 13ᵃ and 14 back to transformer G. The current in this circuit energizes the slow-releasing relay K¹ jointly with that flowing in the circuit through the front contact 9 of track relay R¹ which maintains this relay energized under normal conditions.

If the train enters the section A—B from the spur Y¹, it de-energizes the track relay R¹, causing it to open its front contact 9. This will not, however, cause the de-energization of the slow-releasing relay K¹, as it normally would for an eastbound through train, for the reason that the current is shunted through the contact 89 of the stick relay P¹ and around the contact 9 of track relay R¹. As a result, the slow-releasing relay K¹ remains energized and maintains the signal circuit through its back contact 23 open. The object of this particular construction is to prevent the crossing signal S from operating for a slow moving train that is relatively remote from the highway crossing. This not only conserves electrical energy but avoids delaying highway traffic unduly at the crossing.

However, as soon as the train moves into the section B—C, the track relay R² becomes de-energized and opens its front contact 11, thereby causing the de-energization of the slow-releasing relay K¹. At the expiration of a predetermined interval of time this relay permits its back contacts 23 to close, thereby completing a circuit through the operating mechanism of the crossing signal S.

I will now assume that an eastbound train has passed the switch F² but is still in the section C—D, and that the switch is reversed to admit a westbound train to the main track from the spur or siding Y². When this happens, the circuit controller $f^2$, which is normally closed, is automatically opened. This opens the stick circuit through the stick relay P³, previously described, and causes it to open its front contact 43. This also causes its back contact 66 to close and complete the circuit through the signal operating mechanism so as to give warning at the crossing of the approach of the westbound train. Were it not for this automatic opening of the stick circuit for the relay P³ by the circuit controller $f^2$, it might happen that the westbound train would enter section C—D before the eastbound train had left this section, and under these conditions relay P³ would remain energized. This would prevent the signal S from being operated for the westbound train.

From the foregoing it will be apparent that I have provided a very simple and flexible signaling system that will permit of numerous shifting movements of trains and combinations of train movements in the vicinity of a highway crossing and by means of which a signal is operated at such crossing when necessary with a minimum expenditure of electrical energy and traffic delay at the crossing. It will also be apparent that I have provided a system that may be superimposed on or employed in conjunction with any type of signaling to accommodate local conditions, without necessitating any alterations therein or impairing the operation of either.

Although I have herein shown and described only one form of signaling apparatus embodying my invention, it is understood that various changes and modifications may be made therein within the scope of the appended claims without departing from the spirit and scope of my invention.

Having thus described my invention, what I claim is:

1. In combination, a plurality of sections of railway track, a track relay for each of said sections, a slow-releasing relay associated with each of said track relays and each having an energizing circuit which includes a contact of the associated track relay, a stick relay controlled by each of said slow-releasing relays and by the associated track relay, and a signal controlled jointly by said slow-releasing relays and said stick relays.

2. In combination, two adjacent sections of railway track, a track relay for each of said sections, a slow-releasing relay controlled by each of said track relays and energized when and only when its associated track relay is energized, a stick relay associated with each of said slow-releasing relays, a pick-up circuit for each of said stick relays controlled by the associated slow-releasing relay, a stick circuit for each of said stick relays controlled by the associated track relay, a signal, and an operating circuit for said signal controlled jointly by said slow-releasing relays and by said stick relays.

3. In combination, a section of railway track, a track relay for said section, a slow-releasing relay associated with said track relay and having an energizing circuit which includes a front contact of said track relay, a stick relay associated with said slow releasing relay, a pick-up circuit for said stick relay controlled jointly by said track relay and by said slow-releasing relay, a stick circuit for said stick relay controlled by said track relay, a highway crossing signal located adjacent to said track, and a control circuit for said signal controlled jointly by said slow-releasing relay and by said stick relay.

4. In combination two adjacent sections of railway track, a track relay for each said section, a slow-releasing relay for each said section controlled by the associated track relay, a stick relay for each section, a pick-up circuit for each said stick relay controlled by a back contact of each said track relay and by a front contact of the corresponding slow-releasing relay, a stick circuit for each said stick relay controlled by a back contact of the associated track relay, a highway crossing signal located adjacent the junction of said two track sections, and two operating circuits for said signal each including a back contact of one said slow-releasing relay and a back contact of the associated stick relay.

5. In combination, two adjacent sections of railway track, two track relays one for each said section, two slow-releasing relays one controlled by each said track relay, two stick relays one for each said section; a pick-up circuit for each said stick relay including a front contact of the associated slow-releasing relay, back contacts of both said track relays, and back contacts of the slow-releasing relay and the stick relay for the other section; a stick circuit for each said stick relay including its own front contact and a back contact of the associated track relay, a highway crossing signal adjacent the junction of said sections, a circuit for said signal including a back contact of one slow-releasing relay and a back contact of the associated stick relay, and a second circuit for said signal including a back contact of the other said slow-releasing relay and a back contact of the other said stick relay.

6. In combination, three sections of railway track, a track switch in said first section, three stick relays, one for each section, means controlled by said switch and by a second of said stick relays as well as by traffic conditions in a first and a second of said sections for controlling a first of said stick relays, means controlled by traffic conditions in each of said sections for controlling said second stick relay, means controlled by traffic conditions in each of said sections for controlling a third of said stick relays, and a highway crossing signal controlled by said second and third stick relays and by traffic conditions in said second and a third of said sections.

7. In combination, three sections of railway track, a track switch in a second of said sections, three stick relays, means controlled by said switch and by a second of said stick relays as well as by traffic conditions in a second of said sections for controlling a first of said stick relays, means controlled by traffic conditions in each of said sections for controlling a second of said stick relays, means controlled by traffic conditions in each of said sections for controlling a third of said stick relays, and a highway crossing signal controlled by said second and third stick relays and by traffic conditions in said second and a third of said sections.

8. In combination, three sections of railway track, a track switch in a second of said sections, three stick relays, means controlled by a second of said stick relays and by traffic conditions in a first of said sections for controlling a first of said stick relays, means controlled by said switch and by traffic conditions in each of said sections for controlling a second of said stick relays, means controlled by traffic conditions in each of said sections for controlling said second stick relay, means controlled by traffic conditions in each of said sections for controlling a third of said stick relays, and a highway crossing signal controlled by said second and third stick relays and by traffic conditions in said second and a third of said sections.

9. In combination, two adjacent sections of railway track, a track relay for each said section, a highway intersecting said track, a highway crossing signal located adjacent said intersection, a first slow-releasing relay associated with one said track relay and having an energizing circuit which includes a contact of said track relay, a second slow-releasing relay associated with the other said track relay and having an energizing circuit which includes a contact of said other track relay, a first stick relay having a pick-up circuit and a stick circuit controlled by one said track relay, a second stick relay having a pick-up circuit and a stick circuit controlled by the other said track relay, a first circuit controlled by said first slow-releasing relay and by said first stick relay for energizing said signal when a train moving in one direction approaches said intersection and a second circuit controlled by said slow-releasing relay and by said second stick relay for energizing said signal when a train moving in the opposite direction approaches said intersection.

10. In combination, three sections of railway track, a slow-releasing relay, three stick relays one for each said section, a circuit for said slow-releasing relay controlled by traffic conditions in a first and a second of said sections, a second circuit for said slow-releasing relay controlled by a first of said stick relays and by traffic conditions in said second section, a track switch in said first section having a contact which is closed when said switch is in a reverse position, a pick-up circuit for a first of said stick relays controlled by said switch contact and by said slow-releasing relay, a second pick-up circuit for said first stick relay controlled by a second of said stick relays, a stick circuit for said first stick relay controlled by traffic conditions in said first section, a pick-up circuit for said second stick relay controlled by traffic conditions in each of said sections, a stick circuit for said second stick relay controlled by traffic conditions in said second section, a pick-up circuit for a third of said stick relays controlled by traffic conditions in each of said sections, a stick circuit for said third stick relay controlled by traffic conditions in a third of said sections, a second slow-releasing relay controlled by traffic conditions in said third section, and a highway crossing signal controlled by both said slow-relasing relays and by said second and third stick relays.

11. In combination, three sections of railway track, a track switch in said first section, a contact device controlled by said switch and closed when said switch is in its reverse position, three track relays for said sections, a slow releasing relay, three stick relays, a circuit for said slow-releasing relay controlled by a first of said track relays and by a second of said track relays, a second circuit for said slow-releasing relay controlled by a first of said stick relays and by said second track relay, a second slow-releasing relay controlled by a third of said track relays, a pick-up circuit for said first stick relay including said switch contact and a front contact of said first slow-releasing relay, a second pick-up circuit for said first stick relay controlled by a second of said stick relays, a stick circuit for said first stick relay controlled by said first track relay, a pick-up circuit for said second stick relay controlled by each of said track relays as well as by each of said slow-releasing relays and by a third of said stick relay a stick circuit for said second stick relay controlled by by said second track relay, a pick-up circuit for said third stick relay controlled by each of said track relays as well as by each of said slow-releasing relays and by said second stick relay, a stick circuit for said third stick relay controlled by said third track relay, a highway crossing signal, an operating circuit for said signal controlled by said second stick relay and said second slow-releasing relay and a second operating circuit for said signal controlled by said third stick relay and said second slow-releasing relay.

12. In combination, three sections of railway track, a slow-releasing relay, three stick relays, a circuit for said slow-releasing relay controlled by traffic conditions in a first and a second of said sections, a second circuit for said slow-releasing relay controlled by a first of said stick relays and by traffic conditions in said second section, a track switch in said second section having a contact device which is closed when said switch is in its normal position, a pick-up circuit for said first stick relay controlled by a second of said stick relays, a stick circuit for said first stick relay controlled by traffic conditions in said first section, a pick-up circuit for said second stick relay controlled by traffic conditions in each of said sections, a stick circuit for said second stick relay controlled by traffic conditions in said second section and said contact device, a pick-up circuit for a third of said stick relays controlled by traffic conditions in each of said sections, a stick circuit for said third stick relay controlled by traffic conditions in a third of said sections, a second slow-releasing relay controlled by traffic conditions in a third of said sections, and a highway crossing signal controlled by said slow-releasing relays and by said second and a third of said stick relays.

13. In combination, three sections of railway track, a track switch in a second of said sections, a contact device controlled by said switch and closed when said switch is in its normal position, three track relays for said sections, a slow-releasing relay, three stick relays, a circuit for said slow-releasing relay controlled by a first and by a second of said track relays, a second circuit for said slow-releasing relay controlled by a first of said stick relays and by said second track relay, a second slow-releasing relay controlled by a third of said track relays, a pick-up circuit for said first stick relay controlled by a second of said stick relays, a stick circuit for said first stick relay controlled by said first track relay, a pick-up circuit for said second stick relay controlled by each of said track relays as well as by each of said slow-releasing relays and by a third of said stick relays, a stick circuit for said second stick relay controlled by said second track relay and by said switch contact, a pick-up circuit for said third stick relay controlled by each of said track relays as well as by each of said slow-releasing relays and by said second stick relay, a stick circuit for said third stick relay controlled by a third of said track relays, a highway crossing signal, an operating circuit for said signal controlled by said second stick relay and said second slow-releasing relay, and a second operating circuit for said signal controlled by said third stick relay and said second slow-releasing relay.

In testimony whereof I affix my signature.

DANIEL W. RICHARDS.